United States Patent [19]

Briggs

[11] Patent Number: 4,916,941

[45] Date of Patent: Apr. 17, 1990

[54] AIR BLEEDING SYSTEM FOR AN AUTOMOTIVE ENGINE COOLING SYSTEM INSTRUMENT MODULE

[76] Inventor: Stephen W. Briggs, 4141 E. Vernon, Phoenix, Ariz. 85008

[21] Appl. No.: 420,116

[22] Filed: Oct. 10, 1989

[51] Int. Cl.⁴ .......................................... G01M 19/00
[52] U.S. Cl. ................................................ 73/118.1
[58] Field of Search ...................... 73/49.7, 40, 118.1, 73/119 R, 198, 714

[56] References Cited

U.S. PATENT DOCUMENTS

| | | | |
|---|---|---|---|
| 3,292,427 | 12/1966 | Mattson | 73/118.1 |
| 3,313,144 | 4/1967 | Johnson | 73/49.7 |
| 3,650,147 | 3/1972 | Moyer | 73/49.7 |
| 4,069,712 | 1/1978 | Armstrong et al. | 73/118.1 |
| 4,235,100 | 11/1980 | Branchini | 73/49.7 |
| 4,494,402 | 1/1985 | Carney | 73/49.7 |

FOREIGN PATENT DOCUMENTS 0076638  5/1985  Japan ..................... 73/49.7

Primary Examiner—Robert Raevis
Attorney, Agent, or Firm—M. David Shapiro

[57] ABSTRACT

The invention comprises an improvement for an automotive engine cooling testing system wherein a coolant reservoir is connected to the instrument module by means of two quick disconnect fittings; each such fitting is provided with an internally located shut-off valve that is actuated to close when a disconnection is made. The improvement provides a convenient way to bleed air out of the cooling system prior to commencement of a testing routine, therefore providing a more accurate test result.

16 Claims, 3 Drawing Sheets

AIR BLEEDING SYSTEM FOR AN AUTOMOTIVE ENGINE COOLING SYSTEM INSTRUMENT MODULE

FIELD OF THE INVENTION

The invention relates to an improved apparatus and method for removing the air from a cooling system instrument module and the associated automotive cooling system.

BACKGROUND OF THE INVENTION

U.S. Pat. No. 3,292,427, issued to W. S. Mattson on Dec. 20, 1966, for an "Analysis Apparatus," discloses a cooling system instrument for use in analyzing problems in automotive cooling systems. U.S. Pat. No. 3,292,427 is incorporated herein by this reference thereto. The disclosed invention comprises an instrument module 10A intended for insertion between a cooling outlet of an internal combustion engine block and an inlet to the automotive cooling radiator. See, FIGS. 1 and 2. The instrument module of the U.S. Pat. No. 3,292,427 includes a flow meter 16 for measuring the flow rate of the engine coolant, and a combination temperature and pressure gauge 32. These three gauges, as incorporated into instrument module 10A, enable one of ordinary skill in the art of cooling system analysis to diagnose almost any engine cooling problem with a high degree of accuracy. However, when the instrument module is inserted into the automotive cooling system, air is entrapped in the system and must somehow be removed before accurate testing may begin.

Subsequent to the filing date of the U.S. Pat. No. 3,292,427, instrument module 10A of the invention there disclosed was modified in an embodiment incorporating two piece transparent plastic moldings (see, FIG. 5, as shown, but without items identified by reference numerals 12 and 14) which served all of the purposes of the module disclosed in the U.S. Pat. No. 3,292,427. This modification allowed an operator to visually sense presence of air in the system by observing air bubble flow in the transparent module.

However, both the system of the prior art invention disclosed in U.S. Pat. No. 3,292,427, and the later version, explained above, suffer from lack of a convenient way to bleed the air out of the cooling system subsequent to the insertion of the instrument module of the '427 patent into that cooling system. Therefore, it is frequently the case that some air is left in the system and air interferes with the operator's ability to get valid information from the system. The undesirable air may be confused by the operator with undesirable aeration by reason of a resident fault in the system under test. For example, if there is already air in the unheated cooling system, it makes it more difficult to discern the presence or collection of any additional air leaking into the system; such as air which may be introduced after engine shut-down by reason of a leak anywhere in the automotive cooling system. This may occur because the system coolant is contracting as the temperature of the coolant is reduced, or by reason of a leak on the suction side of the engine coolant pump during engine operation at normal or excessive operating pressures and temperatures. Extraneous air in the system may also cause problems in reading the flow meter and might affect temperature and pressure readings on the module gauges.

And, finally, aeration of the system may have a detrimental effect on the efficiency of the cooling system, a characteristic which the operator of the instrument is attempting to analyze, thereby yielding erroneous results.

SUMMARY OF THE INVENTION

These and other shortcomings of the prior art automotive cooling instrument are overcome by means of the improvement of the instant invention.

Two quick disconnect valves are added to the prior art instrument module; one at the high point of the plumbing for bleeding off cooling system air and one at a lower point for adding coolant to replace the bled off air; together with a coolant reservoir equipped with pairs of cooperating quick disconnect fittings for attachment to the modified module. The coolant reservoir is then preferably connected to the instrument module of the system by means of the two cooperating and mating quick disconnect valves, one for accepting the bled air and one for supplying additional coolant to the cooling system to replace the bled air. Air from the automotive cooling system, may be returned to the upper volume of the reservoir and coolant is supplied from the bottom of the reservoir; both by means of gravity feed with the automotive engine in a non-operating mode. The quick disconnect fittings are then used to disconnect the reservoir from the automotive cooling system, thereby eliminating any requirement for high temperature and/or high pressure operation of the reservoir.

It is, therefore, an object of the invention to provide apparatus for efficiently and conveniently removing undesirable air from a closed automotive engine cooling system and replacing that air with compatible coolant through a modified and improved cooling system analysis instrument module and reservoir means.

It is another object of the invention to provide an improved method for removing undesired air from a closed automotive engine cooling system about to undergo cooling system testing.

It is still another object of the invention to provide a means and method for removing air from an automotive cooling system just prior to testing the system.

BRIEF DESCRIPTION OF THE DRAWINGS

The invention will be more readily understood upon review of the Detailed Description of the Preferred Embodiment of the Invention, below, together with the drawings in which.

Figure 1:
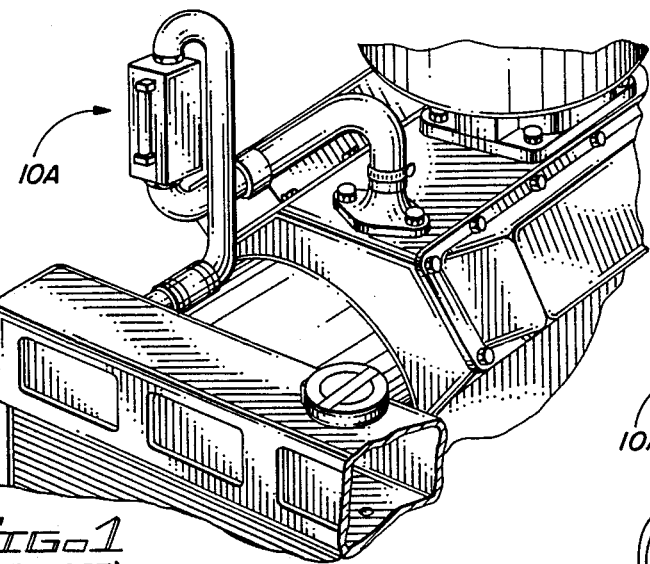
FIG. 1 is similar to FIG. 1 of the U.S. Pat. No. 3,292,427 and illustrates the prior art instrument module installed between an engine block and radiator of an automotive cooling system.
Figure 2:
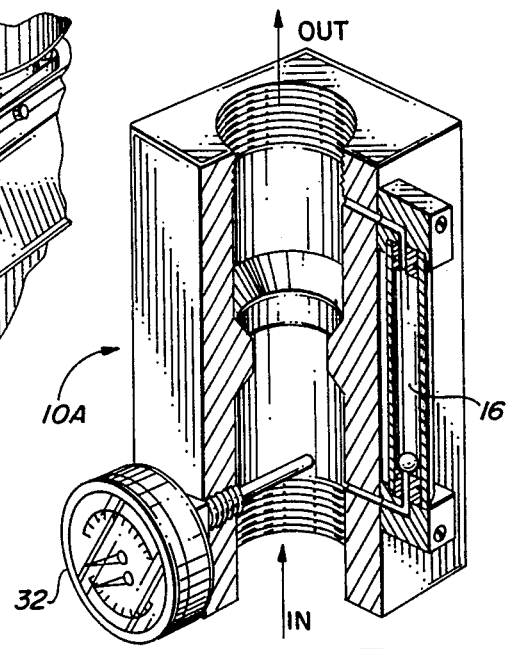
FIG. 2 is similar to FIG. 2 of the prior art U.S. Pat. No. 3,393,427 and illustrates instrument module 10A of FIG. 1 in more detail.

DETAILED DESCRIPTION OF THE PREFERRED EMBODIMENT OF THE INVENTION (It should be noted that wherever in this specification like reference numerals are used they refer to like features of the invention. Wherever an alphabetic suffix is appended to such reference numeral, it indicates a portion of or a variation or different version of the same reference numeral which does not carry such suffix.)

Figure 5:
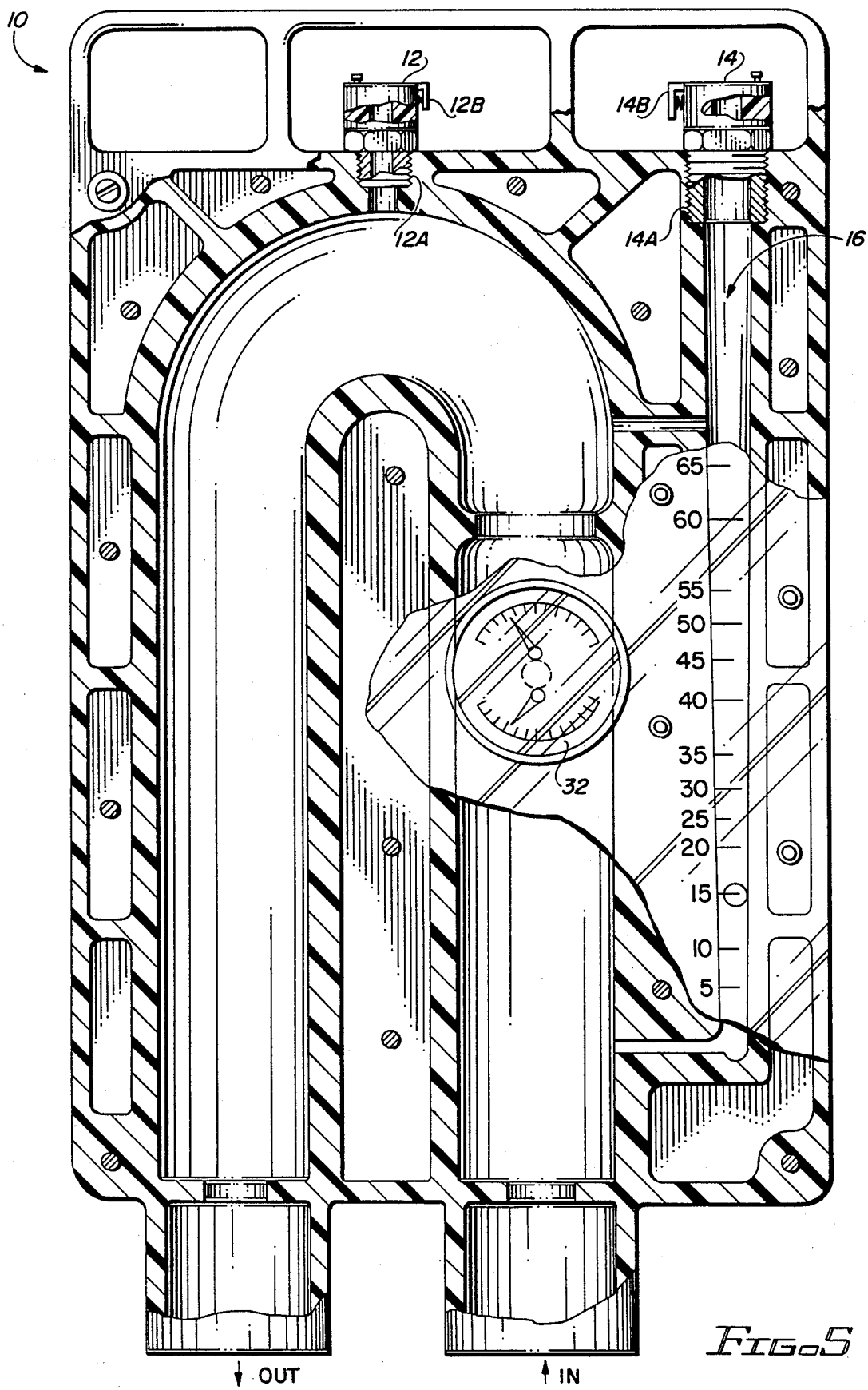
FIG. 5 is illustrative of the prior art instrument module disclosed in U.S. Pat. No. 3,292,427 as modified subsequently and as further modified for the purposes of the instant invention.

The improvement here disclosed may be considered as two fundamental elements. FIG. 5 best shows how the first element, a pair of quick disconnect fittings 12, 14 may be attached to the subsequently modified prior art molded plastic version 10 of the instrument module of the U.S. Pat. No. 3,292,427. These fittings may be fitted to the ports of module 10 with standard pipe thread ends 12A, 14A or any other suitable fastening means, to allow water tight attachment to module 10. Preferably, a first fitting 12 may have a standard 1/8 inch pipe thread size for transmission of undesired air from the highest point in module 10. It should be understood that the instrument module disclosed in the U.S. Pat. No. 3,292,427 could also be modified with the improvement of the instant invention, but the preferred embodiment utilizes the later transparent version of the instrument module because of the inherent advantage of the transparent module type.

A second quick disconnect fitting 14, which may have a standard pipe thread size of ¼ inch, is fitted to a point below that of fitting 12 on module 10. A preferred point for this latter connection may be near the exhaust (upper) port of flow gauge 16. While it is believed that the most efficient operation will derive from these relative placement of fittings 12 and 14, it is also believed that other configurations, in terms of relative positioning of these fittings in module 10, would also be operable and effective.

Quick disconnect fittings 12 and 14 may each be equipped with a manual or an automatic shut-off valve (not shown). Such automatic quick disconnect fittings equipped with (or without) a self contained check valve may be procured from Colder Products Company, 2367 University Avenue, St. Paul, Minn. 55114, as part numbers PMCD 10-02 (reference numeral 12) and PLCD 100-04 (reference numeral 14). In another embodiment of the invention, where reservoir bottle 22 is permanently connected via tubing 28, 30 to the instrument module (see, below), the fittings may be procured from the same source as Part Nos. PMC 10-02 and PLC 100-04, respectively, the "straight through" version of the foregoing valved fittings.

Figure 6:
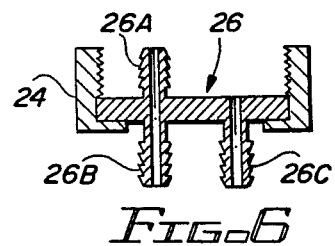
FIG. 6 illustrates a molded sealing washer for use in the cap of bottle 22 of FIGS. 3 and 4 for the purpose of making tubing connections to the reservoir of FIGS. 3 and 4.

The second element of the improvement comprising the instant invention is reservoir bottle 22 with its associated fittings and tubing attachments. Reservoir bottle 22 is filled completely, or nearly completely, with coolant 23 and is turned cap 24 end downward in use. Bottle cap 24, which may be screwed or otherwise attached to bottle 22 to provide a leak proof connection therebetween, is equipped with molded washer 26 incorporating integral molded pipe fittings or ports 26A, 26B and 26C. See, FIG. 6. Fittings 26A and 26B comprise a ½ inch (standard pipe size) through feed from the outside of bottle 22 to the inside of bottle 22 for transporting air upward into bottle 22. In use, relatively flexible tubing 28 is fitted to spigot fitting 26B at one end, and at the other (distal) end, tube 28 is fitted with a barbed quick disconnect fitting 18 which cooperatively mates and with fitting 12 on instrument module 10, and may also have an automatic shut-off valve therein to provide a leak proof disconnectable connection therebetween. Fitting 18 may be part number PMCD 22-02 as obtained from Colder Products Company, above. A "straight through" version of this fitting (without the internal valve) is available as Part No. PMC 22-02.

Figure 3:
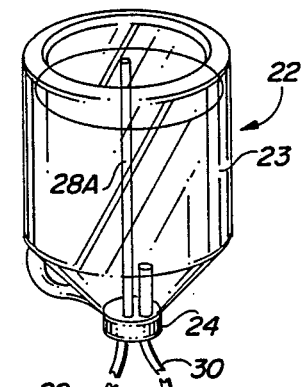
FIG. 3 is a perspective view of the modified instrument module and coolant reservoir according to the instant invention, as installed in an automotive engine cooling system to be tested.
Figure 3:
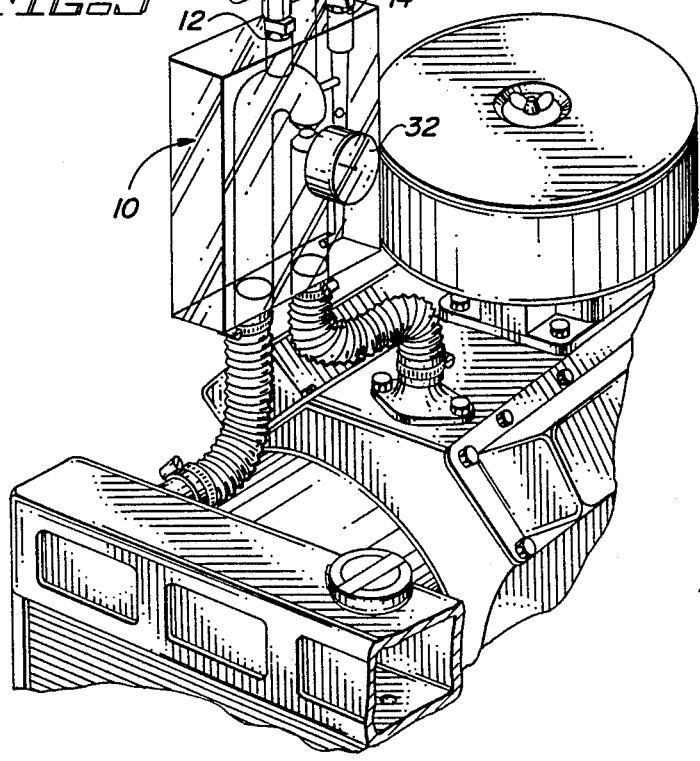
Figure 4:
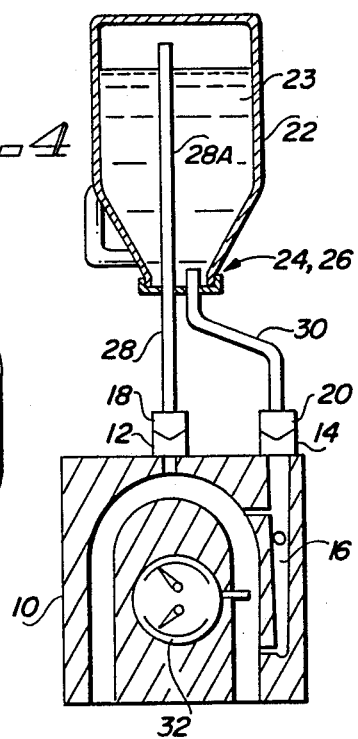
FIG. 4 is a semi-schematic cut-away view of the invention of FIG. 3, as modified; 10

Internal to reservoir 22, a relatively rigid plastic tube 28A is fitted to barbed spigot fitting 26A to conduct air from the cooling system to an upper end of reservoir 22 (in its upside down attitude when in use as shown in FIGS. 3 and 4).

Flexible tube 30, a ¼ inch I.D. tube, is connected at one end to suitably sized barbed spigot fitting 26C (see, FIG. 6) of cap 24 molded washer 26. At the distal end of tube 30, a connection is made to barbed quick disconnect fitting 20 which may be part number PLCD 220-04, obtained from Colder Products Company, above. Part No. PLC 220-04 is available as a "straight through" version of the same fitting (without the internal valve). Release buttons 12B and 14B on fittings 12 and 14, are used to initiate disconnection of fitting 12 from 18 and fitting 14 from 20.

Each of quick disconnect fittings 12, 14, 18 and 20 may be fitted with internal shut-off valves which are normally closed when mating fittings are disconnected. Thus, when bottle reservoir 24 is detached from instrument module 10 by means of the mating quick disconnect fittings 12, 14, and 18, 20, the automotive cooling system is sealed at quick disconnect fittings 12 and 14 by the internal shut-off valves therein and the coolant reservoir 22 is sealed at its tube ends by the valves in fittings 18 and 20. When mating quick disconnect fittings 12 and 18 are connected, their internal shut-off valves are automatically opened. When mating quick disconnect fittings 14 and 20 are connected, their internal shut-off valves are also automatically opened. Thus when coolant reservoir 22 is connected into the instrument module 10 by means of the quick disconnect fittings, air may flow upward from the cooling system into reservoir bottle 22 and coolant may flow downward into the cooling system to replace that air. When the air/coolant flow is completed and all air is exhausted from the automotive cooling system, bottle 22 may be disconnected from the cooling system so that the test may proceed. (While the internal shut-off valves in fittings 18 and 20 are not a convenience which prevents inadvertent coolant leakage from reservoir bottle apparatus 22 when the bottle is not in use.)

In this way, the apparatus of the invention assures that no air remains in the cooling system during test and the coolant reservoir, the bottle and its associated tubing and fittings 22, are not subjected to high temperatures and pressures during the engine operating portion of the testing program as will be indicated by temperature and pressure gauge combination 32.

FIG. 4 illustrates in cross-sectional semi-schematic view the apparatus of the invention of FIG. 3. Quick disconnect fittings 12, 14, 18 and 20 are shown in schematic diagram form. This view makes it clear that any air in the system is likely to gravitate to the top of module 10 where it may be ducted to and collected in reservoir bottle 22 above coolant 23.

OPERATION OF THE SYSTEM

As in the prior art invention, instrument module 10 is connected in place of the coolant hose which would normally connect the block of the automotive engine to the cooling system radiator at its upper end. In the process of making that substitution, a significant amount of coolant is invariably lost from the cooling system. If coolant is added at the radiator cap, it is clear that it will not fill the upper reaches of instrument module 10. The radiator cap (if it was removed) is replaced on the radiator to seal it. Reservoir bottle 22 is filled to an adequate level with suitable (and compatible) coolant fluid and is then connected by means of quick disconnect fittings 18 and 20 to mating quick disconnect fittings 12 and 14, respectively, on module 10. Upon connection, which is accomplished by merely pushing the fittings together, all four of the valves in quick disconnect fittings 12, 14, 18 and 20, are automatically opened. Coolant flows through tubing 30 to fill the upper section of module 10 and the air in the upper reach of the module is forced upward through tubing 28 and 28A to the top of reservoir bottle 22. Coolant reservoir bottle 22 is then removed from the instrument module by pressing release buttons 12B and 14B on fittings 12 and 14. Upon release and disconnection, the valves within the four quick disconnect fittings are automatically closed to prevent loss of coolant fluid from either the cooling system or from reservoir 22.

SIMPLIFIED SYSTEM

While the preferred embodiment of the improvement comprising the instant invention is as has been disclosed, above, it will be understood that a simpler form of the improved system would also be operable. For example, if permanent connections were made between the coolant reservoir and the instrument module, all quick disconnect devices and associated valving could be dispensed with. However, the reservoir and connecting tubing would have to be constructed of materials which could stand repeated operations at the elevated temperatures and pressures encountered under adverse engine operating conditions. There is an advantage demonstrated by this simplified system: trapped air, anywhere in the cooling system, is collected in reservoir 22 once the engine operating temperature is reached. Because of the circulation of coolant in the system which begins once the engine block thermostat attains operating temperature and opens, any air is transported by the cooling system to the high point in module 10. Air trapped in the reservoir would not be recycled back into the cooling system because there is negligible flow in that direction once the air in the cooling system is displaced into the reservoir.

The advantage of the referred embodiment of the improved system lies in the fact that inexpensive and readily available materials may be employed in the reservoir and tubing because they are never exposed to the adverse temperature and pressure conditions of an operating cooling system. That fact keeps the cost of the parts for the preferred embodiment relatively low while assuring a long and useful life.

STATIC PRESSURE TESTING

Figure 7:
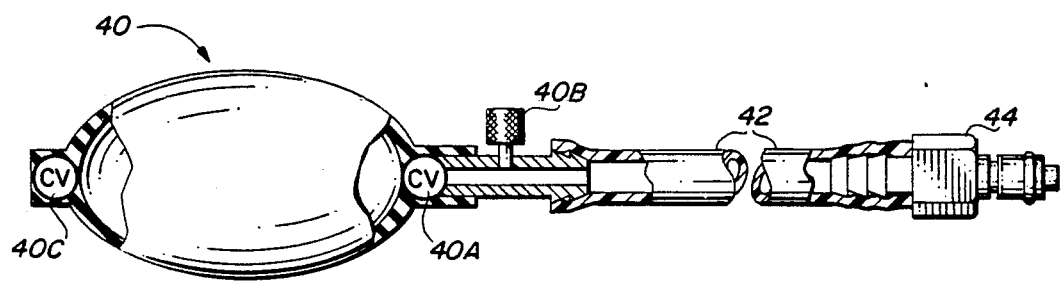
FIG. 7 depicts a pump assembly normally used on a sphygmomanometer together with suitable tubing and a quick disconnect fitting for attachment to the module of FIG. 5.

The quick disconnect system between instrument module 10 and reservoir bottle 22 allow an operator to disconnect the reservoir from the module and utilize one of the quick disconnect fittings 12 or 14 on instrument module 10 to make a connection to an external air pressure source for the purpose of performing a static system pressure test. The air pressure source, see, FIG. 7, may comprise pump 40 of the type commonly and regularly used on a sphygmomanometer. One such product is manufactured by Marshall Products, Model No. 140. Typically, such hand pumps are fitted with check valves 40A and 40C, and release valve 40B to fully control hand pump 40 operation. Pump 40 is fitted with flexible tubing 42 terminated with quick disconnect fitting 44. Pump 40 is connected by means of Colder Products fitting 44 which may be a Part No. PMC 22-04 a straight through fitting without check valve, see, above, to fitting 12 or 14 (see FIG. 5), as stated above. Of course, other pump means could be utilized. A simple adaptor might be employed to make the connection from whatever air source is chosen to instrument module 10. That adaptor should preferably include a check valve which would prevent system air pressure from being lost back through the attachment point to the air source; thus providing a false indication of system pressure loss. That check valve may be of the type commonly used in tire rims or tire tubes for filling and adjusting purposes; such valve commonly known as a Schraeder valve. In any case the pressure gauge built into instrument 32 may be used to monitor system pressure. Pressure produced should be regulated to prevent over pressurization of the cooling system under test. Preferably, system pressure should be controlled by the operator or by a built-in regulatorto less than the maximum pressure allowed by the manufacturer of the cooling system under test to prevent damage to the system. Typically, such maximum pressure will lie in the ten to twenty pound per square inch range.

By monitoring system pressure during such a static test, a significant reduction in pressure in a cold cooling system would be indicative of loss of coolant (and/or air) somewhere in the system and would alert the operator to that problem.

While the invention has been particularly shown and described herein with reference to a preferred embodiment thereof, it will be understood by those skilled in the art that various other modifications and changes may be made to the present invention from the principles of the invention as herein described without departing from the spirit and scope as encompassed in the accompanying claims. Therefore, it is intended in the appended claims to cover all such equivalent variations which may come within the scope of the invention as described.

What is claimed is:

1. In a system for analyzing cooling problems in a closed automotive engine cooling system, wherein a cooling instrument module is inserted in series with a flow path of the automotive cooling system, an improvement comprising in combination:
    a first fluid fitting being connected to a first internal point in the cooling instrument module;
    a second fluid fitting being connected to a second internal point in the cooling instrument module; and
    a coolant reservoir, said coolant reservoir having a first and a second fluid passage through a wall thereof, said first fluid passage being connectable through a first conduit to said first fluid fitting, said second fluid passage being connectable through a second conduit to said second fluid fitting.

2. The system according to claim 1 wherein a source of air pressure is connectable to one of said first and said second fluid fittings in the cooling instrument module.

3. The system according to claim 1 wherein each of said first and said second fluid fittings are of a quick disconnect type, and wherein each of said first and said second conduits comprise, respectively, a third and fourth quick disconnect fitting, each of said third and fourth quick disconnect fittings being, respectively, cooperative with and connectable to said first and said second quick disconnect fittings, respectively, to provide a quickly disconnectable leak proof connection therebetween.

4. The system according to claim 3 wherein at least one of said first, second, third and fourth quick disconnect fittings is fitted with a shut-off valve which is manually operable to either an "on" or to a shut-off condition.

5. The system according to claim 4 wherein a source of air pressure is connectable to one of said first and said second fluid fittings in the cooling instrument module.

6. The system according to claim 3 wherein each of said first, second, third and fourth quick disconnect fittings are fitted with an automatic shut-off valve which is operable to a shut-off condition in response to a disconnection therebetween.

7. The system according to claim 6 wherein a source of air pressure is connectable to one of said first and said second fluid fittings in the cooling instrument module by means of a fifth quick disconnect fitting.

8. The system according to claim 3 wherein a source of air pressure is connectable to one of said first and said second fluid fittings in the cooling instrument module.

9. An improved method for removing air from an automotive cooling system and a testing apparatus comprising an instrument module, the instrument module being connected in series with the automotive engine cooling system, the improved method comprising the steps of:

attaching at least two ports in a coolant reservoir to at least two ports in the instrument module by means of at least two conduits;

allowing air to escape into said coolant reservoir from at least one of said two ports in said instrument module through at least one of said at least two conduits by means of gravitational forces; and allowing a reservoir coolant to flow through another of said at least two conduits from said coolant reservoir bottle to another of said at least two ports in said instrument module by means of gravitational forces.

10. The method according to claim 9 wherein said coolant reservoir bottle is connected to said instrument module by means of a number of quick disconnect fitting pairs equal to the number of said at least two conduits.

11. The method according to claim 10 wherein an air pressure source is connectable to one of said quick disconnect fittings in the cooling instrument module and an additional step comprises:

pressurization of the cooling system to check for air and coolant leaks.

12. The method according to claim 10 wherein each of said quick disconnect fitting pairs comprise at least one automatic shut-off valve, each of said automatic shut-off valves being in a quick disconnect fitting connected to the instrument module, wherein a valve opening step is accomplished by interconnecting a quick disconnect pair of fittings.

13. The method according to claim 12 wherein an air pressure source is connectable to one of said quick disconnect fittings in said instrument module, and an additional step comprises:

pressurization of the cooling system to check for air and coolant leaks.

14. The method according to claim 10 wherein each of said quick disconnect fitting pairs comprises a pair of automatic shut-off valves, wherein an opening step is accomplished by interconnecting an associated quick disconnect pair.

15. The method according to claim 14 wherein an air pressure source is connectable to one of said quick disconnect fittings in the cooling instrument module and an additional step comprises:

pressurization of the cooling system to check for air and coolant leaks.

16. The method according to claim 9 wherein an air pressure source is connectable to one of said first and said second of said at least two conduits, and an additional step comprises:

pressurization of the cooling system to check for air or coolant leaks.

* * * * *

UNITED STATES PATENT AND TRADEMARK OFFICE
CERTIFICATE OF CORRECTION

PATENT NO. : 4,916,941

DATED : April 17, 1990

INVENTOR(S) : Stephen W. Briggs

It is certified that error appears in the above-identified patent and that said Letters Patent is hereby corrected as shown below:

In Col. 4, line 54, after "are not" insert --absolutely required for the operation of the invention, they are--.

Signed and Sealed this

Fifth Day of March, 1991

*Attest:*

HARRY F. MANBECK, JR.

*Attesting Officer*  *Commissioner of Patents and Trademarks*